United States Patent
Lee et al.

(10) Patent No.: US 8,660,563 B2
(45) Date of Patent: Feb. 25, 2014

(54) PREAMBLE DESIGN METHOD FOR REDUCING OVERHEAD DURING HANDOVER IN HIERARCHICAL CELLULAR SYSTEM

(75) Inventors: Joo-Hyun Lee, Suwon-si (KR); Jin-Ghoo Choi, Seoul (KR); Sang-Boh Yun, Seongnam-si (KR); Jong-Ho Lee, Seoul (KR); Yong-Soo Cho, Seoul (KR); Jae-Kwon Kim, Jeollanam-do (KR); Yeong-Jun Kim, Seoul (KR); Kyung-Soo Woo, Seoul (KR); Hyun-Il Yoo, Seoul (KR)

(73) Assignees: Samsung Electronics Co., Ltd., Suwon-si (KR); Chung-Ang University Industry-Academy Cooperation Foundation, Seoul (KR)

( * ) Notice: Subject to any disclaimer, the term of this patent is extended or adjusted under 35 U.S.C. 154(b) by 1018 days.

(21) Appl. No.: 12/316,727

(22) Filed: Dec. 16, 2008

(65) Prior Publication Data

US 2009/0156214 A1   Jun. 18, 2009

(30) Foreign Application Priority Data

Dec. 18, 2007   (KR) .................. 10-2007-0133795

(51) Int. Cl.
*H04W 36/04* (2009.01)
(52) U.S. Cl.
USPC ........... 455/444; 370/332; 370/331; 455/436; 455/443
(58) Field of Classification Search
USPC ............... 455/436–444; 370/331–334
See application file for complete search history.

(56) References Cited

U.S. PATENT DOCUMENTS

| 8,548,484 B2 * | 10/2013 | Lee et al. | 455/450 |
| 2006/0003767 A1 * | 1/2006 | Kim et al. | 455/436 |
| 2006/0035654 A1 | 2/2006 | Lee et al. | |
| 2007/0010251 A1 * | 1/2007 | Cho et al. | 455/436 |
| 2009/0156214 A1 * | 6/2009 | Lee et al. | 455/436 |
| 2011/0201354 A1 * | 8/2011 | Park et al. | 455/456.1 |

FOREIGN PATENT DOCUMENTS

KR   10-2006-0014695   2/2006

OTHER PUBLICATIONS

Ji-Hyun Park, et al.: "Reducing Inter-Cell Handover Events based on Cell ID Information in Multi-hop Relay Systems", IEEE Xplore, Jan. 7, 2010, pp. 743-747.

* cited by examiner

*Primary Examiner* — Allahyar Kasraian

(57) ABSTRACT

Provided is a handover method of a wireless communication system using a hierarchical cellular scheme. In the method, signal quality of a serving node is measured, so that whether to start scanning for a handover is determined. When the scanning for the handover starts, signal qualities of a serving cell including the serving node and one or more neighbor cells are measured through a first preamble including a first identifier for distinguishing a cell. An intra-cell handover or an inter-cell handover is selected using the signal qualities of the serving cell and the neighbor cells. Therefore, a terminal can easily distinguish between the inter-cell handover and the intra-cell handover, and an overhead during a handover can be reduced because an intra-cell handover procedure is simplified.

24 Claims, 15 Drawing Sheets

(A) HIERARCHICAL PREAMBLE STRUCTURE FOR MULTI-HOP RELAY SYSTEM (2 SYMBOLS)

| | PREAMBLE STRUCTURE USING 2 SYMBOLS | |
|---|---|---|
| NAME | CELL PREAMBLE | SUBCELL PREAMBLE |
| SYMBOL | FIRST PREAMBLE | SECOND PREAMBLE |
| CONTENTS | CELL ID | SUBCELL ID |
| MEASUREMENT | CBINR | CRINR |

(B) HIERARCHICAL PREAMBLE STRUCTURE FOR MULTI-HOP RELAY SYSTEM (1 SYMBOL)

| | PREAMBLE STRUCTURE USING 1 SYMBOL | |
|---|---|---|
| CONTENTS | CELL ID | SUBCELL ID |
| MEASUREMENT | CBINR | CRINR |

(A) HIERARCHICAL PREAMBLE STRUCTURE FOR MULTI-HOP RELAY SYSTEM (2 SYMBOLS)

| | PREAMBLE STRUCTURE USING 2 SYMBOLS | |
|---|---|---|
| NAME | CELL PREAMBLE | SUBCELL PREAMBLE |
| SYMBOL | FIRST PREAMBLE | SECOND PREAMBLE |
| CONTENTS | CELL ID | SUBCELL ID |
| MEASUREMENT | CBINR | CRINR |

(B) HIERARCHICAL PREAMBLE STRUCTURE FOR MULTI-HOP RELAY SYSTEM (1 SYMBOL)

| | PREAMBLE STRUCTURE USING 1 SYMBOL | |
|---|---|---|
| CONTENTS | CELL ID | SUBCELL ID |
| MEASUREMENT | CBINR | CRINR |

FIG.7

PREAMBLE DESIGN METHOD FOR REDUCING OVERHEAD DURING HANDOVER IN HIERARCHICAL CELLULAR SYSTEM

CROSS-REFERENCE TO RELATED APPLICATION(S) AND CLAIM OF PRIORITY

The present application claims priority under 35 U.S.C. §119 to an application filed in the Korean Intellectual Property Office on Dec. 18, 2007 and assigned Serial No. 10-2007-0133795, the contents of which are incorporated herein by reference.

TECHNICAL FIELD OF THE INVENTION

The present invention relates generally to an apparatus and a method for reducing an overhead during a handover in a hierarchical cellular system and, in particular, to an apparatus and a method for reducing an overhead during a handover using a preamble including a cell identification (ID) and a subcell ID in a hierarchical cellular system.

BACKGROUND OF THE INVENTION

FIG. 1 illustrates the construction of a conventional cellular system.

As illustrated in FIG. 1, a terminal 1 (101) is located in a service area of a base station (BS) 1(100) and receives service from the BS 1(100).

When the terminal 1(101) moves to a service area of a BS 2(110), the terminal 1(101) performs an inter-cell handover to the BS 2(110). For example, the terminal 1(101) performs a handover to the BS 2(110) as illustrated in FIG. 2.

FIG. 2 illustrates a conventional handover procedure in a cellular system.

As illustrated in FIG. 2, a terminal receiving service from a serving BS obtains information on neighbor BSs from the serving BS (step 200).

After that, the terminal measures the signal quality of the serving BS (step 210), and compares a value of a parameter representing the signal quality of the serving BS with a threshold (step 220).

When the value of the parameter representing the signal quality is less than the threshold, the terminal starts scanning for a handover (step 230). For example, when scanning, the terminal requests the serving BS to perform scanning (step 231). After that, when the terminal receives a scanning performing signal from the serving BS (step 233), the terminal performs scanning for the neighbor BSs using the information on the neighbor BSs provided from the serving BS (step 235). Here, the information on the neighbor BSs includes an identifier of a neighbor BS, a preamble used by neighbor BSs, or training signal information from a physical layer whose signal quality can be measured.

After performing the scanning for the handover, the terminal determines whether to perform a handover to a BS whose signal quality is best with reference to the scanning results (step 240). For example, the terminal determines whether to perform a handover by comparing the sum of a Carrier to Interference and Noise Ratio (CINR) of the serving BS and a handover threshold determined by a target node with a highest CINR confirmed through scanning.

When not performing a handover, the terminal obtains again information on neighbor BSs from the serving BS (step 200).

Meanwhile, when performing a handover to a BS whose signal quality is best, the terminal performs a handover procedure to the BS whose signal quality is best (step 250). For example, when performing a handover to a BS whose signal quality is best, the terminal requests the serving BS to perform the handover (step 251). After that, upon receiving a response signal to the handover request (step 253), the terminal confirms whether a BS accepts the handover from the response signal (step 255).

When the BS rejects the handover (step 258), the terminal receives again a response signal to the handover request (step 253).

Also, when the BS cancels the handover, the terminal suspends the handover.

Meanwhile, when the BS accepts the handover (step 257), the terminal performs network entry to a target BS (step 260). That is, the terminal performs ranging and capability negotiation, an authorization procedure, and a registration procedure with the target BS. Here, the target BS means the BS whose signal quality is best, selected in step 240.

With development of radio technology, small cells such as relay stations (RSs) can be located inside a macro cell as illustrated in FIG. 3.

FIG. 3 illustrates the construction of a conventional multi-hop relay system.

As illustrated in FIG. 3, an RS 1 and an RS 2 are located in a service area of a BS 1, and an RS 3 and an RS 4 are located in a service area of a BS 2 to provide service. Accordingly, a handover by a mobile terminal occurs more frequently than the cellular system illustrated in FIG. 1. For example, when a terminal that has received service from the BS 1 moves to the service area of the RS 1, the terminal performs a handover to the RS 1. Also, when a terminal that has received service from the RS 1 moves to a service area of the RS 2, the terminal performs a handover to the RS 2. Therefore, a handover by a terminal in a multi-hop relay system occurs more frequently than the cellular system illustrated in FIG. 1.

When a handover is performed, an overhead is generated by a terminal due to a ranging procedure, a capability negotiation procedure with a BS accessed through the handover, an authentication procedure, and a registration procedure. Therefore, as occurrence frequency of a handover increases, an overhead for a handover increases even more.

SUMMARY OF THE INVENTION

To address the above-discussed deficiencies of the prior art, it is a primary object of the present invention to provide an apparatus and a method for reducing overhead during a handover in a hierarchical cellular system.

Another object of the present invention is to provide an apparatus and a method for reducing overhead during a handover by simplifying a handover procedure inside a cell in a hierarchical cellular system.

Still another object of the present invention is to provide an apparatus and a method for distinguishing between an intra-cell handover and an inter-cell handover in a hierarchical cellular system.

Yet another object of the present invention is to provide an apparatus and a method for generating a preamble including information for distinguishing between an intra-cell handover and an inter-cell handover in a hierarchical cellular system.

According to an aspect of the present invention, a method for forming a preamble in a wireless communication system using a hierarchical cellular scheme, the method includes: forming a first preamble including a first identifier for identifying a cell; and forming a second preamble including a second identifier for identifying a subcell of one or more nodes having the same first identifier.

According to another aspect of the present invention, a handover method of a wireless communication system using a hierarchical cellular scheme, the method includes: determining whether to start scanning for a handover using signal quality of a serving node; when the scanning for the handover starts, measuring signal qualities of a serving cell including the serving node and one or more neighbor cells through a first preamble including a first identifier for identifying a cell; and selecting one of an intra-cell handover and an inter-cell handover using the signal qualities of the serving cell and the neighbor cells.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is a view illustrating information included in a preamble of a multi-hop relay system according to an exemplary embodiment of the present invention;

DETAILED DESCRIPTION OF THE INVENTION

FIGS. 4 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, exemplary embodiments of the present invention provide a technique for reducing overhead during a handover of a terminal in a hierarchical wireless communication system.

A hierarchical wireless communication system includes macro cells and small cells mixed with each other. For example, like a multi-hop relay system, a hierarchical wireless communication system includes a cell of a base station and a cell of a relay station mixed with each other. Also, in a hierarchical wireless communication system, a macro cell and a femtocell can be mixed with each other.

Hereinafter, of hierarchical wireless communication systems, a multi-hop relay system is illustrated by way of example. Note that the exemplary embodiments of the present invention are applicable to other types of wireless communication systems.

The multi-hop relay system has a structure in which a plurality of relay stations are located in a cell region of a base station. Accordingly, a mobile terminal can perform an intra-cell handover inside the cell region of the base station, or perform an inter-cell handover between different cell regions. Here, the intra-cell handover includes a handover between relay stations inside a cell region of one base station, and a handover between a base station and a relay station. Also, the inter-cell handover includes a handover between a base station 1 and a base station 2, a handover between the base station 1 and a relay station located inside a cell region of the base station 2, and a handover between a relay station located inside a cell region of the base station 1 and a relay station located inside the cell region of the base station 2.

The multi-hop relay system assigns a cell ID to a base station in order to distinguish between an intra-cell handover and an inter-cell handover, and assigns a subcell ID designed in connection with the cell ID to a relay station. At this point, the base station and the relay station transmit the cell ID and the subcell ID to a terminal as illustrated in FIG. 4 or 5.

Figure 4:
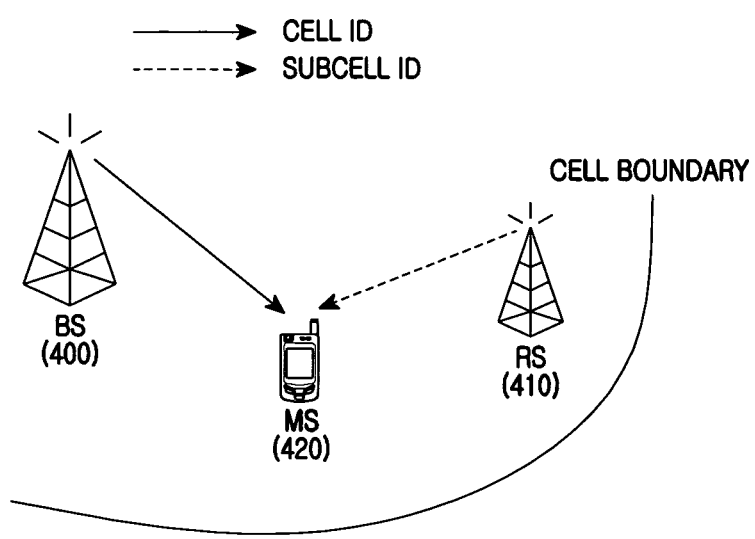
FIG. 4 is a view illustrating the construction of a multi-hop relay system for transmitting a preamble according to an exemplary embodiment of the present invention.
Figure 5:
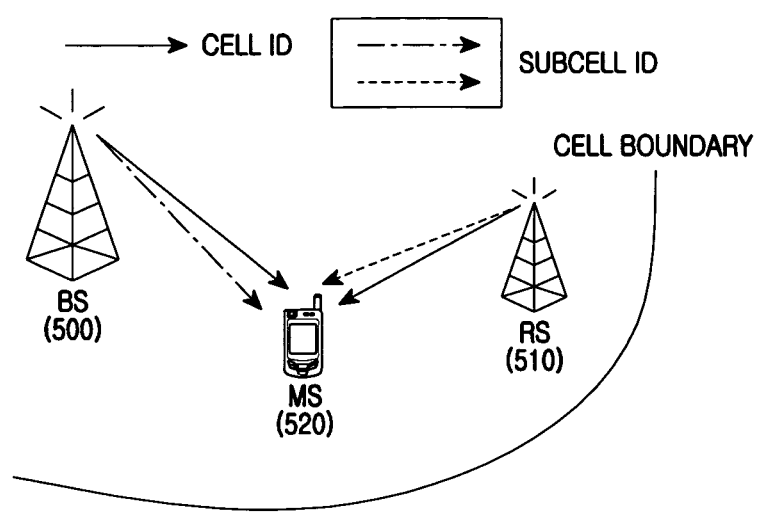
FIG. 5 is a view illustrating the construction of a multi-hop relay system for transmitting a preamble according to another exemplary embodiment of the present invention.

FIG. 4 illustrates the construction of a multi-hop relay system for transmitting a preamble according to an exemplary embodiment of the present invention.

As illustrated in FIG. 4, a base station 400 transmits a preamble including a cell ID to a terminal 420. A relay station 410 transmits a preamble including a subcell ID to the terminal 420. In the following description, a preamble including a cell ID is referred to as a cell preamble, and a preamble including a subcell ID is referred to as a subcell preamble.

Here, the cell ID represents an identifier for identifying a cell, and the subcell ID represents an identifier for identifying between a base station and a relay station included in one cell.

As described above, in the case where a base station transmits a cell preamble, and a relay station transmits a subcell preamble, since one cell region is greater than a service area of the base station, a terminal located outside the service area of the base station cannot easily detect the preamble of the base station. Therefore, the base station and the relay station transmit a cell ID and a subcell ID to the terminal as illustrated in FIG. 5.

FIG. 5 illustrates the construction of a multi-hop relay system for transmitting a preamble according to another exemplary embodiment of the present invention.

As illustrated in FIG. 5, a base station 500 and a relay station 510 transmit a cell ID and a subcell ID to a terminal 520 using a preamble. At this point, the method for allowing the base station 500 and the relay station 510 to transmit a cell ID and a subcell ID depends upon the number of symbols assigned to a preamble. For example, in the case where two symbols are assigned to a preamble, the base station 500 and the relay station 510 convey a cell ID and a subcell ID on one preamble, and transmit the preamble to the terminal 520. Meanwhile, in the case where one symbol is assigned to a preamble, the base station 500 and the relay station 510 transmit a cell preamble and a subcell preamble to the terminal 520. Here, the cell ID represents an identifier for identifying a particular cell, and the subcell ID represents an identifier for distinguishing between a base station and a relay station included in one cell.

Figure 6:
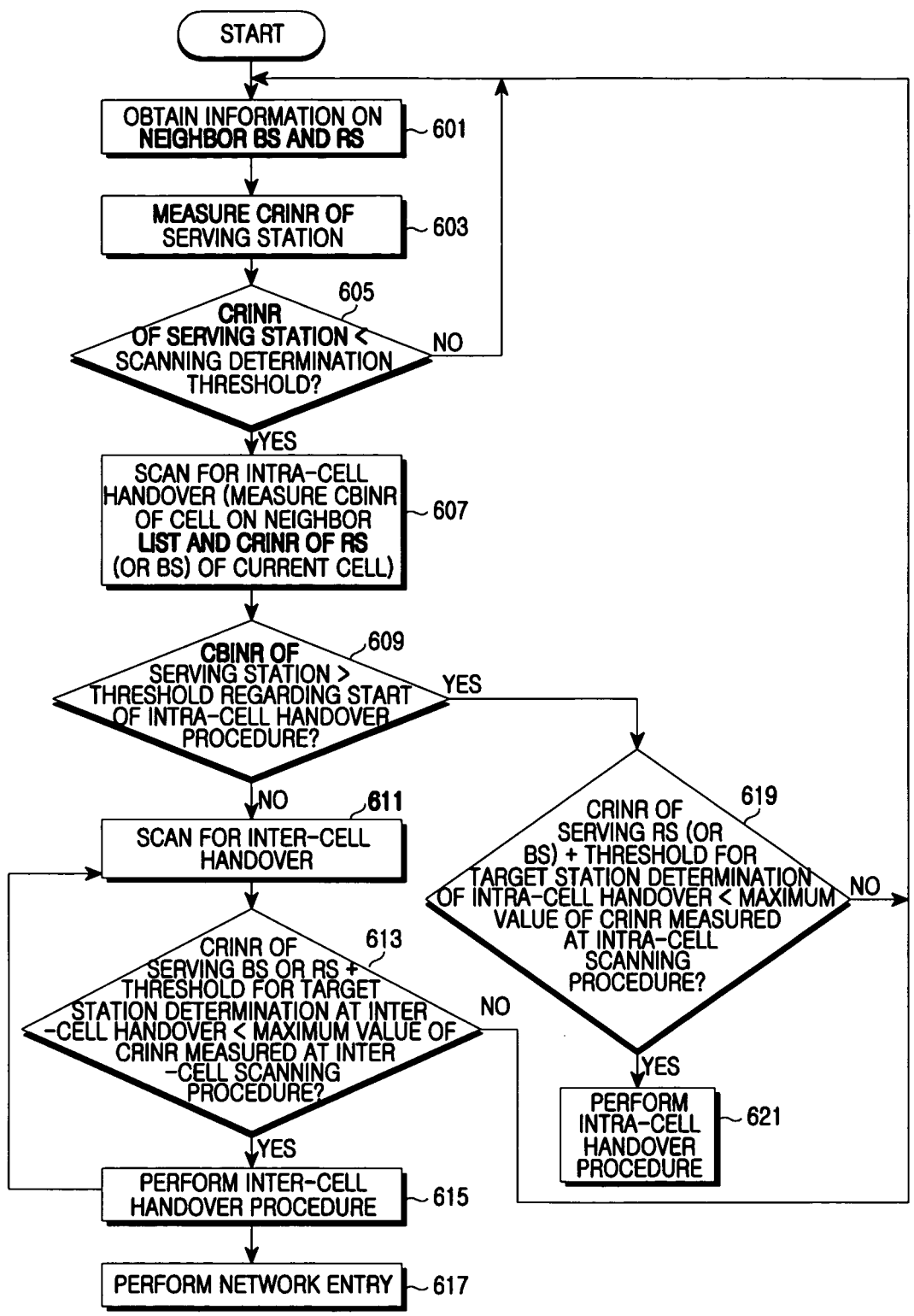
FIG. 6 is a view illustrating a handover procedure of a multi-hop relay system according to an exemplary embodiment of the present invention.

As described above, the base station and the relay station transmit a cell ID and a subcell ID to a terminal so that the terminal can distinguish between an inter-cell handover and an intra-cell handover. At this point, the terminal distinguishes between an inter-cell handover and an intra-cell handover using the preambles provided from a base station and a relay station as illustrated in FIG. 6. In the following description, signal quality of a cell ID measured by a terminal using a preamble is referred to as a Carrier of BS to Interference and Noise Ratio (CBINR), and signal quality of a subcell ID is referred to as a Carrier of RS to Interference and Noise Ratio (CRINR). At this point, the CBINR represents signal quality of a cell controlled by a base station, and the CRINR represents signal quality of a subcell controlled by a relay station connected in the lower ranking of the base station.

FIG. 6 illustrates a handover procedure of a multi-hop relay system according to an exemplary embodiment of the present invention.

As illustrated in FIG. 6, a terminal obtains information on neighbor nodes from a serving node (step 601). Here, the neighbor nodes include neighbor base stations and neighbor relay stations.

After that, the terminal measures a CRINR of a serving node (RS or BS) in order to determine scanning start (step 603).

After measuring the CRINR of the serving node, the terminal compares the CRINR measured for determining scanning start with a threshold for scanning start determination (step 605).

When the CRINR of the serving node exceeds the threshold, the terminal obtains again information on neighbor nodes from the serving node (step 601).

Meanwhile, when the CRINR of the serving node is less than the threshold, the terminal performs scanning for an intra-cell handover (step 607). For example, when scanning for an intra-cell handover, the terminal measures CBINRs of cell IDs of neighbor cells included in the information on the neighbor nodes obtained in step 601, and CRINRs of subcell IDs of nodes (base stations or relay stations) included in a serving cell.

After scanning for the intra-cell handover, the terminal compares the CBINR of the serving cell measured in step 607 with an intra-cell handover threshold in order to determine whether to perform an intra-cell handover (step 609).

When the CBINR of the serving cell is greater than the threshold, the terminal selects a target node in order to perform an inter-cell handover (step 619). For example, the terminal compares the CRINR of the serving node measured in step 603 with the CRINRs of the neighbor nodes included in the serving cell and measured in step 607 to select a target node in order to perform an intra-cell handover. At this point, when the CRINR of the serving node is greater than the CRINRs of the neighbor nodes, the terminal recognizes that there does not exists a target node on which an intra-cell handover is to be performed. Meanwhile, when there exist neighbor nodes whose CRINR is greater than the CRINR of the serving node, the terminal selects a neighbor node whose CRINR is greatest as the target node. For another example, the terminal can compare the sum of a threshold for an intra-cell handover and the CRINR of the serving node with the CRINRs of the neighbor nodes to select the target node on which an intra-cell handover is to be performed in order to prevent a ping-pong phenomenon by a handover. At this point, when the sum of the threshold for the intra-cell handover and the CRINR of the serving node is greater than the CRINRs of the neighbor nodes, the terminal recognizes that there does not exist a target node on which an intra-cell handover is to be performed. Meanwhile, when there exist neighbor nodes whose CRINR is greater than the sum of the threshold for the intra-cell handover and the CRINR of the serving node, the terminal selects a neighbor node whose CRINR is greatest as the target node.

When there does not exist the target node on which an intra-cell handover is to be performed in step 619, the terminal obtains information on neighbor nodes from the serving node (step 601).

Meanwhile, when selecting the target node on which an intra-cell handover is to be performed in step 619, the terminal performs the intra-cell handover to the selected target node (step 621). For example, the terminal accesses the target node through a ranging procedure and a capability negotiation procedure with the target node. At this point, since the target node is included in the same cell as that of the serving node, an authorization procedure and a registration procedure may not be performed.

When the CBINR of the serving cell is less than the threshold in step 609, the terminal determines to perform an inter-cell handover. Therefore, the terminal scans for an inter-cell handover (step 611). For example, when scanning for an inter-cell handover, the terminal measures CRINRs of subcell IDs of nodes (base stations or relay stations) included in a neighbor cell having a greatest CBINR among CBINRs of the neighbor cells, measured in step 607.

After scanning for the inter-cell handover, the terminal selects a target node on which an inter-cell handover is to be performed (step 613). For example, the terminal compares a CRINR of the serving node measured in step 603 with CRINRs of the neighbor nodes included in the neighbor cell having a greatest CBINR measured in step 611 to select a target node on which an inter-cell handover is to be performed. At this point, when the CRINR of the serving node is greater than the CRINRs of the neighbor nodes, the terminal recognizes that there does not exists a target node on which an inter-cell handover is to be performed. Meanwhile, when there does exist CRINRs of the neighbor nodes that are greater than the CRINR of the serving node, the terminal selects a neighbor node having a greatest CRINR as the target node. For another example, the terminal can compare the sum of a threshold for an inter-cell handover and the CRINR of the serving node with the CRINRs of the neighbor nodes to select the target node on which an inter-cell handover is to be performed in order to prevent a ping-pong phenomenon during a handover. At this point, when the sum of the threshold for the inter-cell handover and the CRINR of the serving node is greater than the CRINRs of the neighbor nodes, the terminal recognizes that there does not exist the target node on which an inter-cell handover is to be performed. Meanwhile, when there exist neighbor nodes whose CRINR is greater than the sum of the threshold for the inter-cell handover and the CRINR of the serving node, the terminal selects a neighbor node having a greatest CRINR as the target node.

When there does not exist the target node on which an inter-cell handover is to be performed in step 613, the terminal obtains information on neighbor nodes from the serving node (step 601).

Meanwhile, when selecting the target node on which an inter-cell handover is to be performed in step 613, the terminal accesses the target node through the inter-cell handover to the selected target node (steps 615 to 617). For example, the terminal performs a ranging procedure and a capability negotiation procedure with the target node, an authorization procedure and a registration procedure to access the target node.

In the above embodiment, the terminal compares a CBINR of the serving cell with an intra-cell handover threshold in order to determine whether to perform an intra-cell handover. In another embodiment, the terminal can compare the CBINR of the serving cell with CBINRs of neighbor cells to determine whether to perform an intra-cell handover. At this point, when the CBINR of the serving cell is greater than the CBINRs of the neighbor cells, the terminal determines to perform the intra-cell handover.

Hereinafter, the construction of a preamble including a cell ID and a subcell ID to distinguish between an inter-cell handover and an intra-cell handover is illustrated using an exemplary embodiment. At this point, in the case where the preamble includes a cell ID and a subcell ID, the preamble has the characteristics illustrated in FIG. 7. In the following description, a preamble including a cell ID and a subcell ID is referred to as a hierarchical preamble.

FIG. 7 illustrates information included in a preamble of a multi-hop relay system according to an exemplary embodiment of the present invention.

Referring to FIG. 7, part (a) of FIG. 7 illustrates the characteristics of a preamble including two symbols, and part (b) of FIG. 7 illustrates the characteristics of a preamble including one symbol.

As illustrated in part (a) of FIG. 7, in the case where the preamble includes two symbols, the preamble includes a cell preamble including a cell ID and a subcell preamble including a subcell ID. In this case, the terminal estimates a CBINR of a serving cell through the cell preamble, and estimates a CRINR of a serving node through the subcell preamble.

As illustrated in part (b) of FIG. 7, in the case where the preamble includes one symbol, the preamble includes a cell ID and a subcell ID. In this case, the terminal estimates a CBINR of a serving cell through a cell ID included in the preamble and estimates a CRINR of a serving node through the subcell ID.

As described above, in the case of transmitting the cell ID and the subcell ID using the preamble including two symbols, a method of assigning the cell ID to the cell preamble and a method of assigning the subcell ID to the subcell preamble are independent of each other. For example, nodes assign a cell ID to a cell preamble using a first method of assigning on different subcarriers in a frequency domain, a second method of assigning an orthogonal code or a quasi-orthogonal code on the same subcarrier, and a method of mixing the first and second methods. Also, the nodes assign a subcell ID to a subcell preamble using the first method, the second method, and the method of mixing the first and second methods. Since a technique for adding a cell ID and a subcell ID to a preamble and transmitting the same is described hereinafter, descriptions of synchronization processes such as frame detection, frequency offset estimation, and timing offset estimation performed using a preamble are omitted.

For example, in case of assigning a cell ID using the first method, a cell 1 assigns a preamble sequence to a subcarrier whose index is 3 k (k=0, . . . N−1) in a frequency domain. Also, a cell 2 can assign a preamble sequence to (3 k+1), and a cell 3 can assign a preamble sequence to (3 k+2).

At this point, with the assumption that integral frequency offset has been compensated for, the terminal detects an index of a subcarrier to which a cell ID of a serving cell has been assigned from a cell preamble to estimate the cell ID of the serving cell. Also, in the case of assigning a subcell ID using the first method, the terminal can detect an index of a subcarrier to which a subcell ID of a serving node has been assigned from a subcell preamble to estimate the subcell ID of the serving node.

Figure 8:
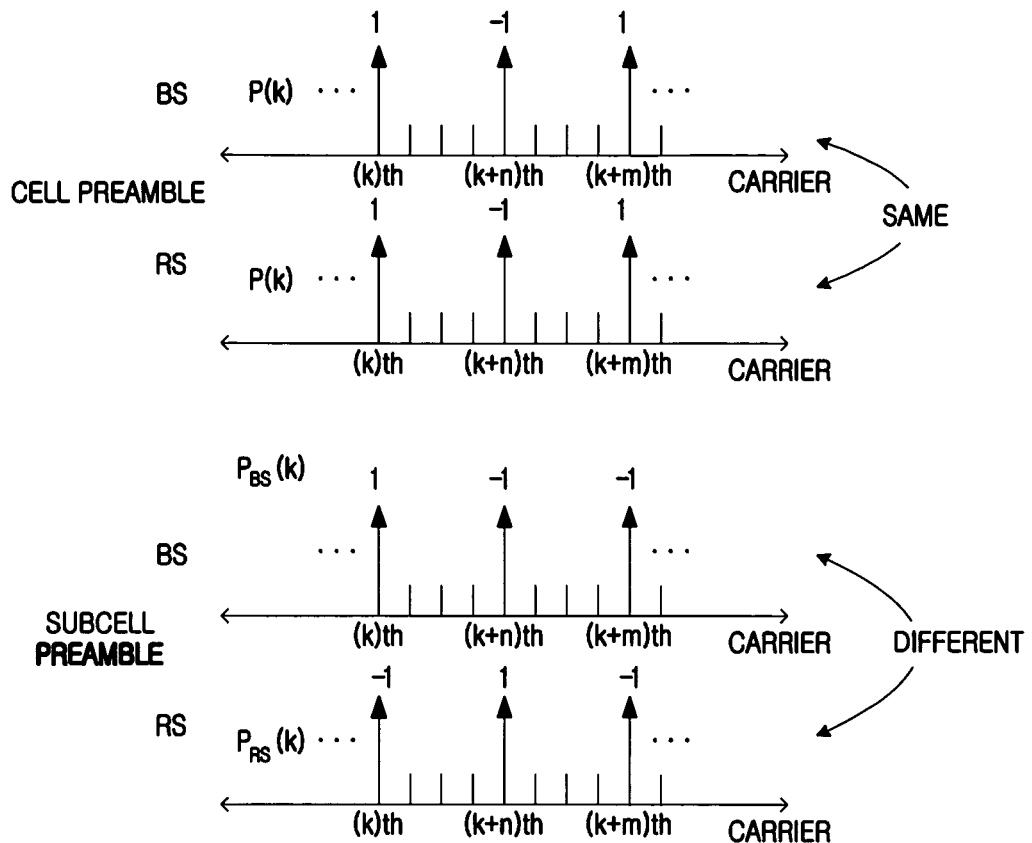
FIG. 8 is a view illustrating a preamble structure of a multi-hop relay system according to an exemplary embodiment of the present invention.

For another example, in the case of assigning a cell ID using the second method, a cell assigns different orthogonal codes or quasi-orthogonal codes to the same subcarrier according to a cell ID to assign the cell ID to a cell preamble as illustrated in FIG. 8.

FIG. 8 illustrates a preamble structure of a multi-hop relay system according to an exemplary embodiment of the present invention.

As illustrated in FIG. 8, in the case of assigning an orthogonal code or a quasi-orthogonal code to the same subcarrier to assign a cell ID to a cell preamble, nodes included in the same cell assign the same orthogonal code or quasi-orthogonal code to assign the cell ID to the cell preamble.

Meanwhile, the nodes included in the same cell assign different orthogonal codes or quasi-orthogonal codes to assign a subcell ID to a subcell preamble.

Accordingly, the terminal can detect the preamble of a serving cell to detect a cell ID of the serving cell. Also, the terminal can detect a preamble code of the serving node to detect a subcell ID of the serving node.

For another example, in the case where the first and second methods are mixed with each other, a cell ID can be assigned to different subcarriers, and a subcell ID can be assigned to an orthogonal code connected hierarchically, so that the cell ID and the subcell ID can be distinguished from one other.

In the case of forming a hierarchical preamble as described above, the terminal can easily distinguish between an inter-cell handover and an intra-cell handover using the preamble. In this case, the terminal has the advantage of reducing a scanning procedure for neighbor nodes compared to the case where a hierarchical preamble is not formed.

In the case of transmitting a cell ID and a subcell ID using a preamble including one symbol, the nodes add a subcell ID to a preamble that transmits a cell ID and transmit the same. For example, the nodes assign a cell ID to a cell preamble using a first method of assigning on different subcarriers in a frequency domain, a second method of assigning an orthogonal code or a quasi-orthogonal code on the same subcarrier, and a method of mixing the first and second methods. Also, the nodes additionally add a subcell ID to the preamble using a phase change in a subcarrier set, a subcarrier shift, and the addition of an imaginary part.

Figure 9:
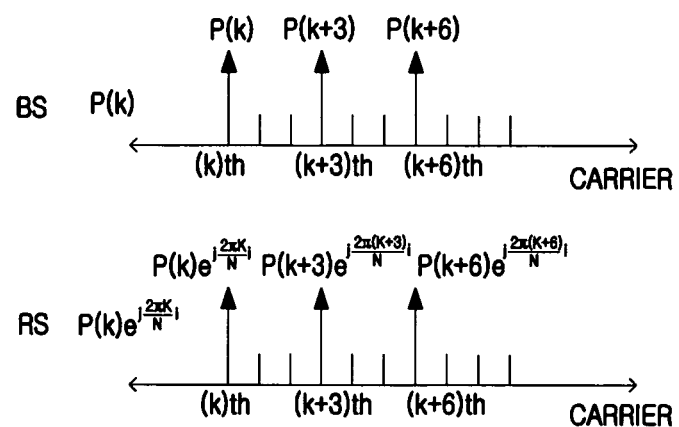
FIG. 9 is a view illustrating a preamble structure of a multi-hop relay system according to another exemplary embodiment of the present invention.

FIG. 9 illustrates a preamble structure of a multi-hop relay system according to another exemplary embodiment of the present invention.

As illustrated in FIG. 9, the nodes assign an orthogonal code or quasi-orthogonal code according to a cell ID to the same subcarrier to assign the cell ID to a preamble. At this point, the nodes change the phase of a subcarrier set to additionally assign a subcell ID to the preamble to which the cell ID has been assigned.

Figure 10:
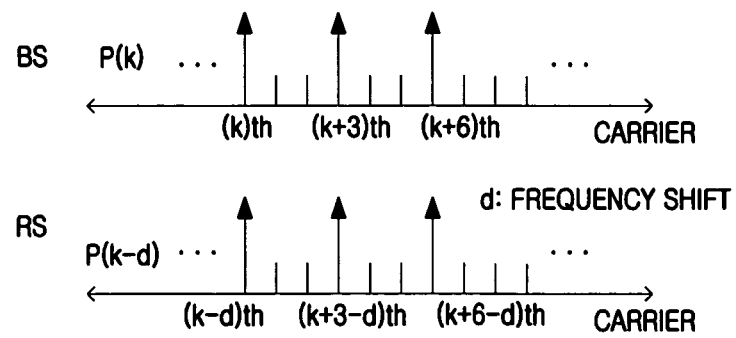
FIG. 10 is a view illustrating a preamble structure of a multi-hop relay system according to still another exemplary embodiment of the present invention.

FIG. 10 illustrates a preamble structure of a multi-hop relay system according to still another exemplary embodiment of the present invention.

As illustrated in FIG. 10, the nodes assign an orthogonal code or quasi-orthogonal code according to a cell ID to the same subcarrier to assign the cell ID to a preamble. At this point, the nodes shift a subcarrier set to additionally assign a subcell ID to the preamble to which the cell ID has been assigned.

Figure 11:
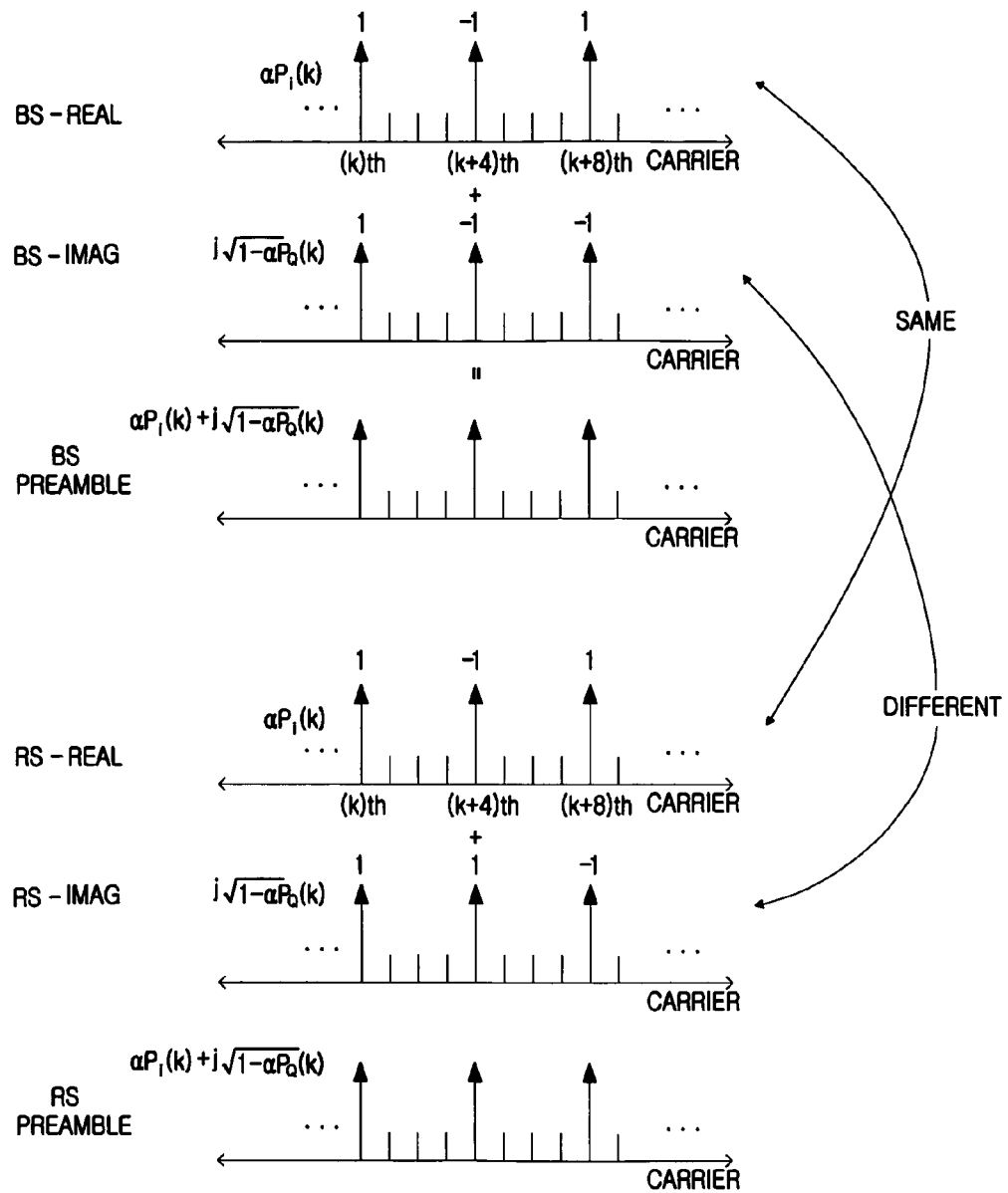
FIG. 11 is a view illustrating a preamble structure of a multi-hop relay system according to yet another exemplary embodiment of the present invention.

FIG. 11 illustrates a preamble structure of a multi-hop relay system according to yet another exemplary embodiment of the present invention.

As illustrated in FIG. 11, the nodes assign an orthogonal code or quasi-orthogonal code according to a cell ID to the same subcarrier to assign the cell ID to a preamble. At this point, the nodes assign an orthogonal code or quasi-orthogonal code to the same subcarrier of an imaginary part to additionally assign a subcell ID to the preamble to which the cell ID has been assigned.

As illustrated in FIG. 9, in the case of shifting the phase of a subcarrier set and assigning a subcell ID, the nodes included in the same cell has the same cell ID using one same preamble sequence of 114 sequences. At this point, the nodes include different subcell IDs. Therefore, the nodes uniquely change the phases of preambles which the terminal transmits so that the nodes are distinguished from one another.

At this point, the terminal can measure a CBINR and a CRINR using the preamble including one symbol, and perform all initial synchronization process. For example, the preamble including one symbol is defined by Equation 1 below:

$$X_i^c(k) = X^c(k) e^{j\frac{2\pi k}{N} \cdot i \cdot S}, \quad [\text{Eqn. 1}]$$

where c is a preamble index, $X^c$ is a preamble sequence including a cell ID according to a preamble index, k is a frequency index, N is a size of Fast Fourier Transform (FFT), s is a phase shift variable, and I is a subcell ID. Here, the preamble index has a value between 0 to 113 in total, and preamble indexes of 0-37, 38-75, and 76-113 include a combination of 38 cell IDs and segments 0, 1, and 2. At this point, preambles corresponding to the segments 0, 1, and 2 are assigned to different subcarriers in a frequency domain. For example, a base station transmits a preamble having no phase change where a subcell ID is 0, and a relay station phase-shifts the preamble of the base station by a predetermined degree and transmits the phase-shifted preamble. At this point, a phase shift factor is designated greater than a round trip time of a cell.

As described above, a hierarchical preamble including a cell ID and a subcell ID can be formed. At this point, in the case of forming a hierarchical preamble using a preamble sequence of Institute of Electrical and Electronics Engineers (IEEE) 802.16j, the hierarchical preamble has the same PAPR characteristic as the preamble sequence of IEEE 802.16j. Therefore, the hierarchical preamble can be formed by minimally changing a preamble prescribed in the standard of IEEE 802.16j.

Also, a terminal can identify an inter-cell movement using a CBINR estimated using a hierarchical preamble, and identify an intra-cell movement using a CRINR, so that the terminal can easily select a path through which a signal is to be received.

Also, in the case of using a hierarchical preamble, since nodes included in the same cell use the same preamble sequence, and distinguish themselves according to the phase of the preamble, a unique preamble does not need to be assigned for each node. Therefore, the number of sequences available at the preamble substantially increases.

Also, in the case of using a hierarchical preamble, a performance deterioration does not occur while a terminal located at the boundary of intra-cell nodes performs an initial synchronization process.

Hereinafter, a synchronization process when a hierarchical preamble is used is illustrated. First, in case of detecting a frame using a hierarchical preamble, a terminal can perform synchronization using a characteristic of three instances of repetitions in a time domain of the preamble as expressed by Equation 2 below:

$$\hat{\tau} = \max_{n} \left( \left| \sum_{l=0}^{L} r^*(n+l) \cdot r(n+l+d) \right| \right), \quad [\text{Eqn. 2}]$$

where r(n) is a preamble received in a time domain, L is a window size for a self-correlated operation, d is a period of a repeated pattern of a preamble, and n is a frame index.

A terminal detects a frame using Equation 2, and then estimates a symbol timing offset and a fractional frequency offset using the cyclic prefix (CP) of a received signal according to Equation 3 below:

$$s(n) = \sum_{m=0}^{M-1} \left( \sum_{l=0}^{N_q} r^*(\tau_{tmp} + (m+1) \cdot N_{sym} + n + l) \cdot \right.$$
$$\left. r(\tau_{tmp} + (m+1) \cdot N_{sym} + n + l + N) \right) \quad [\text{Eqn. 3}]$$

$$\tau_{sym} = \max_{n} (|s(n)|), \Delta(f)_{init} = \frac{1}{2\pi} \arg(s(\tau_{sym})),$$

where $\tau_{temp}$ is a start position of a symbol estimated by Equation 2, M is the number of symbols used for enhancing an estimation performance, s(n) is a self-correlated value, $\tau_{sym}$ is an estimated symbol timing offset, and $\Delta f_{init}$ is an estimated fractional frequency offset. Also, $N_{cp}$ is the size of a CP, $N_{sym}$ is the length of Orthogonal Frequency Division Multiplexing (OFDM) including a CP, and m is an index of a symbol used for enhancing an estimation performance.

Terminal compensates for a preamble using a fractional frequency offset and a symbol timing offset estimated by Equation 3. At this point, the preamble which the terminal has compensated for can be expressed in a frequency domain by Equation 4 below:

$$R(k) = \sum_{i=0}^{N_{RS}} X_i^c(k) H_i(k) + w_i, \quad \text{[Eqn. 4]}$$

where R(k) is a preamble signal received in a frequency domain, $N_{RS}$ is the number of relay stations within a cell, $H_i(k)$ is a channel response between an i-th relay station and a terminal, $w_i$ is an additive reception noise, $X^c$ is a preamble sequence including a cell ID according to a preamble index, and k is a frequency index.

When an Algorithm using the Intercarrier Differential Correlation (AIDC) is applied to the reception signal represented in Equation 4, the terminal can estimate a cell ID and an integral frequency offset as expressed by Equation 5 below:

$$(\tilde{c}, \tilde{f}_I) = \max_c \sum_{k=1}^{N_p} R(k+f_I) R^*(k-3+f_I) X^{c^*}(k) X^c(k-3), \quad \text{[Eqn. 5]}$$

where $\tilde{c}$ is an estimated preamble index, $f_I$ is an integral frequency offset generated to a received preamble signal, $\tilde{f}_I$ is an estimated integral frequency offset, $N_p$ is the length of a preamble sequence, $X^c$ is a preamble sequence including a cell ID according to a preamble index, and k is a frequency index. A call ID and a segment ID are estimated using an estimated preamble index. At this point, as the number of relay stations within a cell increases, the power of a received preamble signal increases, so that the cell ID estimated by the terminal has an even higher reliability.

That is, the terminal detects a cell ID transmitted in common by nodes within a cell using Equation 5. A segment ID estimated using Equation 5 is a segment ID of a base station. A segment ID of a relay station is estimated after detection of a subcell ID. However, the present invention is concentrated on an aspect of conveying a cell ID and a subcell ID on a preamble, and transmitting the preamble, and a method of estimating a segment ID that can be applicable variously is omitted. The terminal can determine an inter-cell movement circumstance by detecting a cell ID received in common within a cell. Here, a CBINR determining an inter-cell movement is defined by Equation 6 below:

$$CBINR = \frac{p_C}{p_S - p_C}, \quad \text{[Eqn. 6]}$$

$$p_S = \sum_{K=1}^{N_P} (|R(3 \cdot k)|^2 + |R(3 \cdot k + 1)|^2 + |R(3 \cdot k + 2)|^2),$$

$$P_C = \left| \sum_{k=1}^{N_P} (R^*(3 \cdot k) \cdot R(3 \cdot (k-1)) \cdot X^C(3 \cdot k) \cdot X^{C^*}(3 \cdot (k-1)) \right|,$$

where $P_s$ is the power of a received signal, $P_c$ is a mutual correlation value of a preamble which a terminal received from a serving cell, $X^c$ is a preamble sequence including a cell ID according to a preamble index, and k is a frequency index. Since nodes within one cell transmit the same preamble sequence, the terminal can determine an inter-cell movement circumstance through the mutual correlation operation of Equation 6.

After estimating a cell ID, the terminal estimates a subcell ID of a node through which a signal is to be substantially received through an Algorithm based on Channel Impulse Response (ACIR) using Equation 7 below:

$$\tilde{i} = \max_i \left| IFFT\left(R(x) X^{\tilde{c}^*}(k)\right) \right|, \quad \text{[Eqn. 7]}$$

where $\tilde{i}$ is an estimated subcell ID (i.e., a phase rotation of a preamble for uniquely identifying a relay station), $X^c$ is a preamble sequence including a cell ID according to a preamble index, k is a frequency index, and R(x) is a preamble signal received in a frequency domain.

When the ACIR is applied to a received preamble signal as illustrated in Equation 7, a channel response is shifted in a time domain by a phase rotation in a frequency domain. Therefore, the terminal compares a channel response between an i-th node and the terminal, and selects a node having a greatest channel response. Also, the terminal can estimate a symbol timing offset.

The terminal can distinguish between an intra-cell handover and an inter-cell handover using a hierarchical preamble of the terminal. For example, the terminal prepares a handover when a CRINR estimated through a preamble is less than a predetermined threshold. At this point, when the CRINR estimated through the preamble is less than the predetermined threshold, the terminal performs an inter-cell handover. Meanwhile, when the CRINR estimated through the preamble is greater than a predetermined threshold, the terminal performs an intra-cell handover. An intra-cell handover of the terminal can be expressed by Equation 8 using a CBINR and a CRINR as described above:

CRINR<Threshold$_{RS}$,

CBINR>Threshold$_{BS}$,  [Eqn. 8]

where CRINR is signal quality of a subcell ID estimated through a preamble, and CBINR is signal quality of a cell ID estimated through a preamble.

In Equation 8, when a CRINR is less than a threshold, the terminal prepares a handover. At this point, when a CBINR is greater than a predetermined threshold, a signal intensity of a serving cell is greater than that of a neighbor cell, so that the terminal performs an intra-cell handover.

Also, an inter-cell handover of the terminal can be expressed by Equation 9 below:

CRINR<Threshold$_{RS}$,

CBINR<Threshold$_{BS}$,  [Eqn. 9]

where CRINR is signal quality of a subcell ID estimated through a preamble, and CBINR is signal quality of a cell ID estimated through a preamble.

In Equation 9, when a CRINR is less than a predetermined threshold, the terminal prepares a handover. At this point, when a CBINR is less than a predetermined threshold, a signal intensity of a serving cell is less than that of a neighbor cell, so that the terminal performs an inter-cell handover.

Hereinafter, a performance change when a hierarchical preamble is used is described. At this point, it is assumed that a multi-hop relay system for describing a performance change according to a hierarchical preamble is configured as illustrated in FIG. 12.

Figure 12:
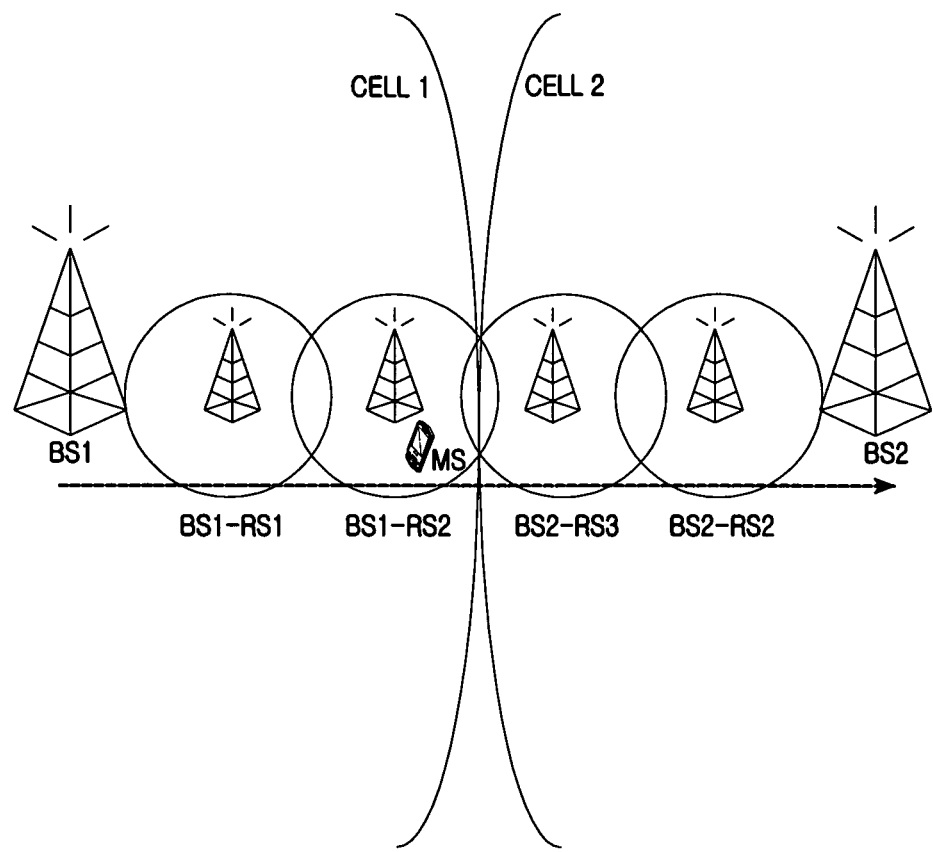
FIG. 12 is a view illustrating a cell construction of a multi-hop relay system according to an exemplary embodiment of the present invention.

FIG. 12 illustrates a cell construction of a multi-hop relay system according to an exemplary embodiment of the present invention.

FIG. 12 illustrates CBINR and CRINR change depending on a movement of a terminal, and a handover performance time. At this point, it is assumed that the terminal moves from a BS 1 of a cell 1 to a BS 2 of a neighbor cell 2, and passes through four RSs while it moves. Also, it is assumed that a distance between the BS 1 and the BS 2 is 1 km, and a distance between a BS and an RS, and between an RS and an RS are 200 m. Also, it is assumed that a channel between the terminal and a BS, or between the terminal and an RS is a channel environment of International Telecommunications Union Radiocommunication sector (ITU-R) PedA 50 km/h.

Figure 13:
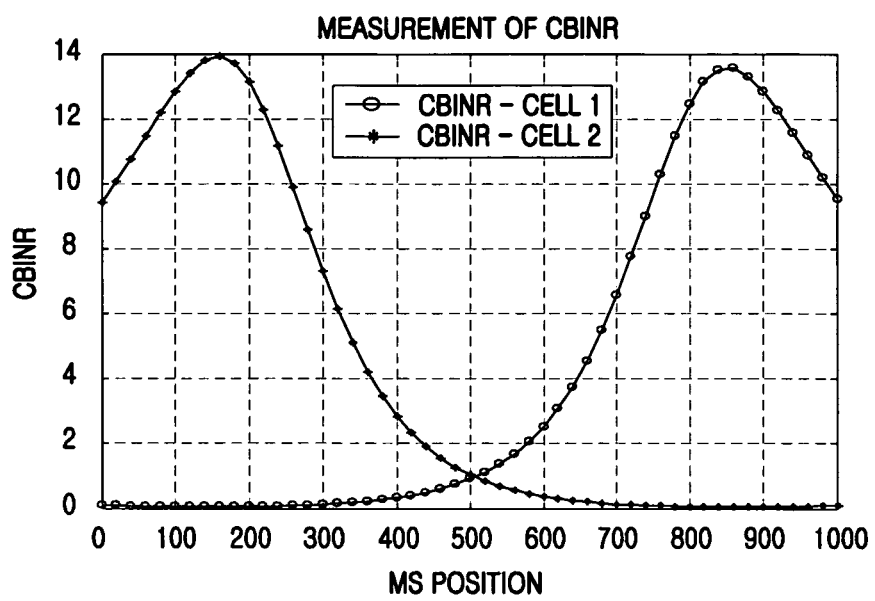
FIG. 13 is a view illustrating a change in a CBINR according to an exemplary embodiment.

FIG. 13 illustrates a change in a CBINR according to an exemplary embodiment.

As illustrated in FIG. 13, a terminal can confirm that a CBINR of a neighbor cell is greater than a CBINR of a serving cell at a point separated by 500 m from the BS 1.

Figure 14:
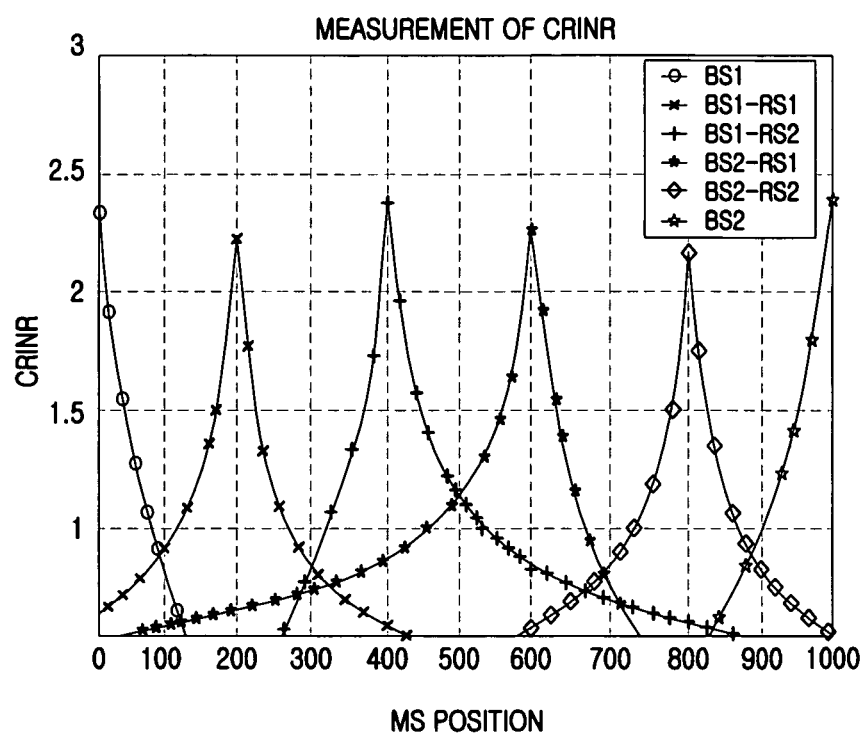
FIG. 14 is a view illustrating a change in a CRINR according to an exemplary embodiment.

FIG. 14 illustrates a change in a CRINR according to an exemplary embodiment.

As illustrated in FIG. 14, the terminal can confirm that a CRINR of a neighbor node is greater than a CRINR of a serving node at the boundary between a BS and an RS, or between an RS and an RS.

That is, when moving from the BS1-RS1 to the BS1-RS2 in FIG. 12, the terminal decides to perform an intra-cell handover because a CRINR and a CBINR estimated through a preamble meet the requirements of Equation 8. Meanwhile, when moving from the BS1-RS2 to the BS2-RS3, the terminal decides to perform an inter-cell handover because a CRINR and a CBINR estimated through a preamble meet the requirements of Equation 9.

Hereinafter, a consumed time when a handover is performed as in FIG. 6 using a hierarchical preamble is compared with a consumed time when a handover is performed as in FIG. 2.

Figure 1:
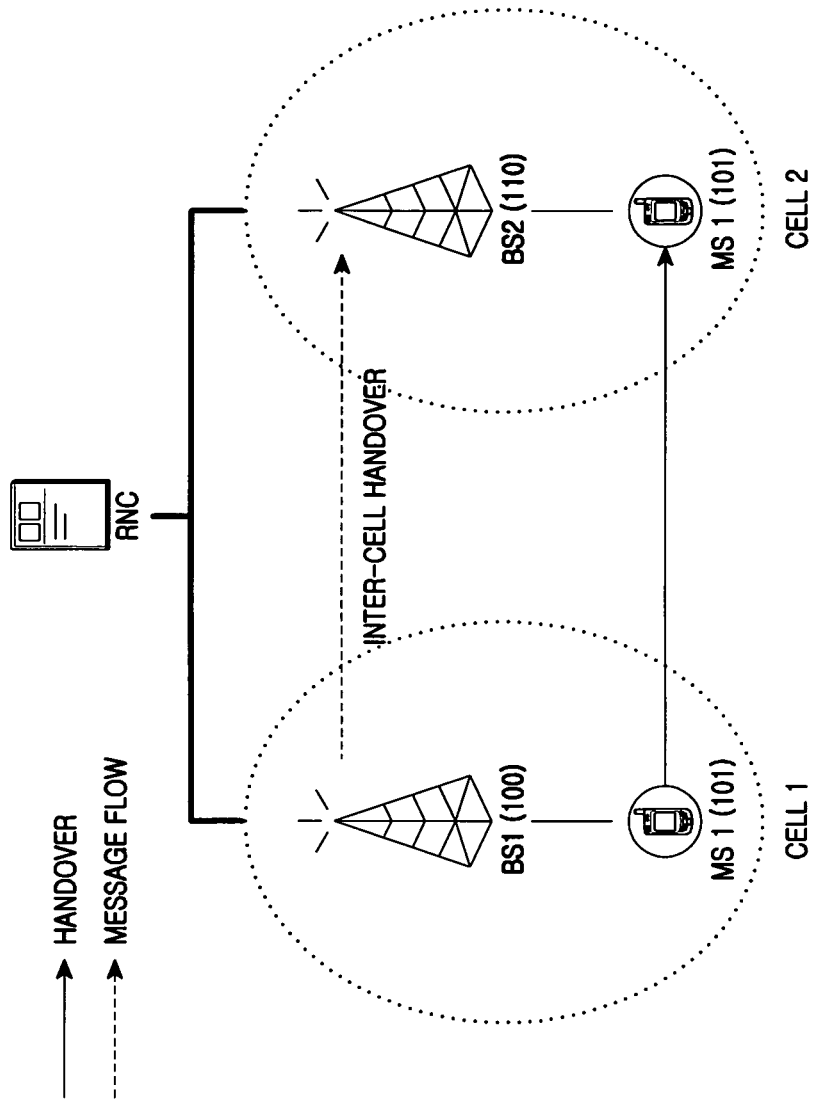
FIG. 1 is a view illustrating the construction of a conventional cellular system.
Figure 2:
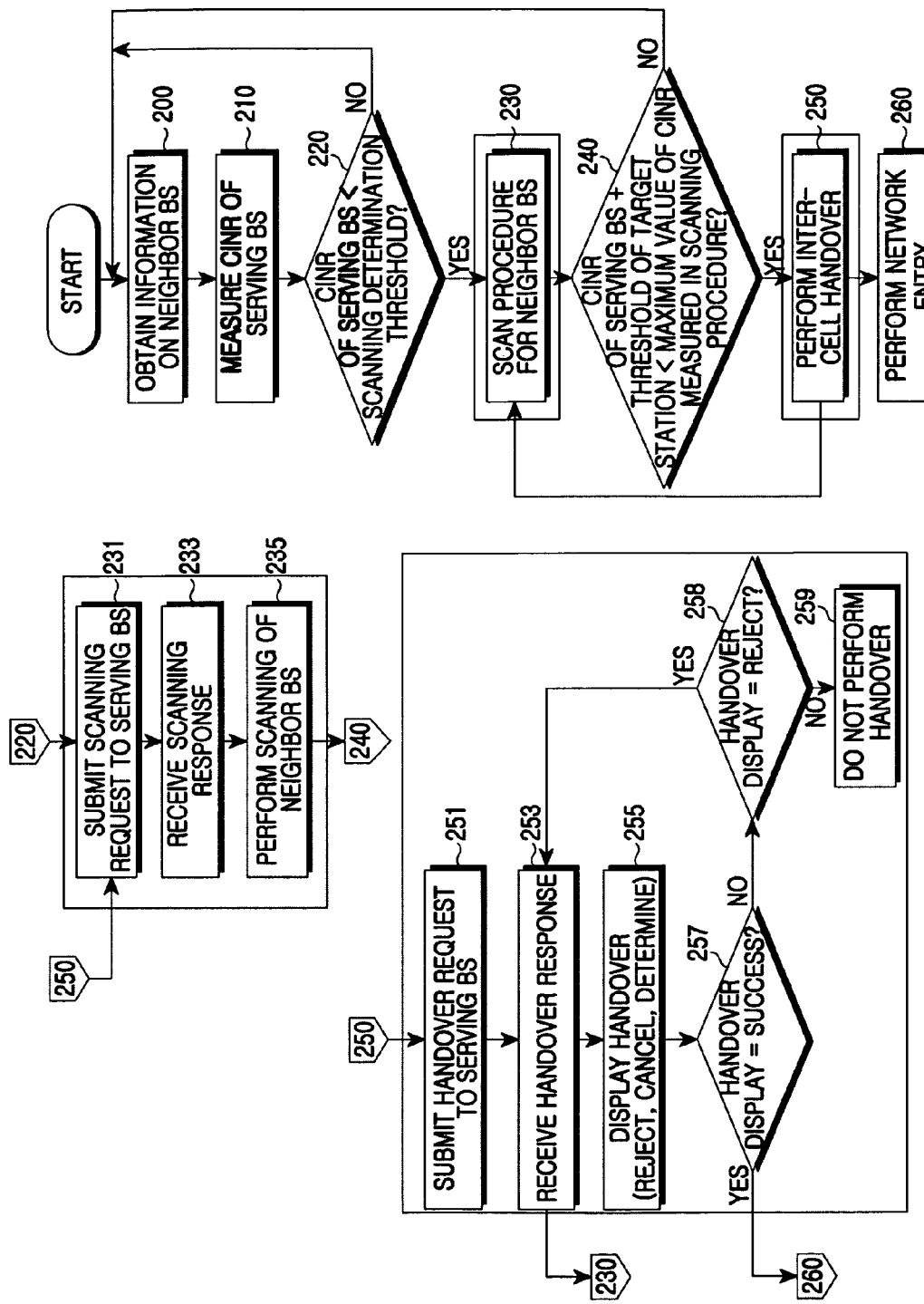
FIG. 2 is a view illustrating a handover procedure in a conventional cellular system.
Figure 3:
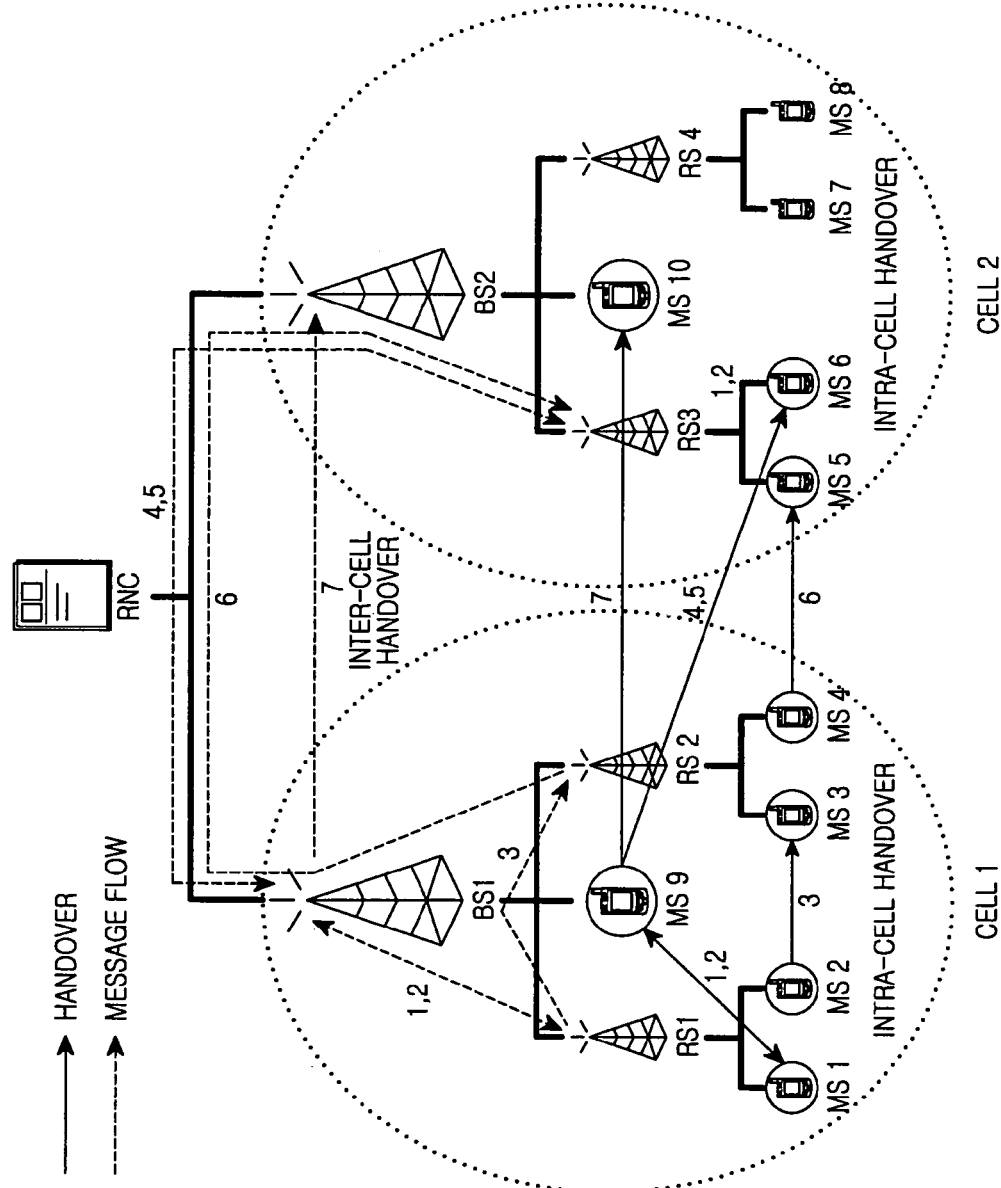
FIG. 3 is a view illustrating the construction of a conventional multi-hop relay system.

First, when the handover is performed as in FIG. 2, a handover consumed time is given by Equation 10 below:

T0=required time for measuring signal strength: 50 ms
T1=required time for one neighboring BS or RS scanning: 30 ms
T2=required time for obtaining parameters: 10 ms
T3=required time for contention based ranging: 150 ms (50% loading)
T4=required time for registration: 35 ms
T5=required time for HO decision & initiation: 50 ms
T6=required time for authorization: 220 ms $$\text{Total: } T0+T1+T2+T3+T4+T5+T6=545 \text{ ms,} \qquad \text{[Eqn. 10]}$$

where T0 is a time consumed for measuring a CINR in FIG. 2, T1 is a time consumed for scanning of a target node through a network backbone message when a terminal selects the target node through CINR measurement, T2 is a time consumed for receiving a parameter of a target node, T3 is a time consumed for the terminal to perform ranging on a target node, T4 is a time consumed for the terminal to register in a target node, T5 is a time consumed for determining a handover, and T6 is a time consumed for authentication.

In the case of performing an inter-cell handover using Equation 10, a handover consumed time is 545 ms. At this point, regarding T0, it is assumed that 10 neighbor nodes are provided as a neighbor BS list, and a time consumed for measuring a CINR of one node is 1 frame period (5 ms).

In the case of using a hierarchical preamble proposed by the present invention, the terminal performs an intra-cell handover procedure illustrated in FIG. 6. At this point, a handover consumed time is given by Equation 11 below:

T0=required time for measuring signal strength: 5 ms
T1=required time for one neighboring BS or RS searching: 30 ms
T2=required time for obtaining parameters: 10 ms
T3=required time for contention based ranging: 150 ms (50% loading)
T5=required time for HO decision & initiation: 50 ms $$\text{Total: } T0+T1+T2+T3+T5=245 \text{ ms,} \qquad \text{[Eqn. 11]}$$

where T0 is a time consumed for measuring a CRINR, T1 is a time consumed for scanning of a target node through a network backbone message when a terminal selects the target node, T2 is a time consumed for receiving a parameter of a target node, T3 is a time consumed for the terminal to perform ranging on a target node, and T5 is a time consumed for determining a handover.

In the case of performing an intra-cell handover using a hierarchical preamble, the terminal can reduce a signal quality measuring time of a signal transmitted from a neighbor node, and a network re-entry procedure of the terminal. Therefore, T0, T4, and T6 in Equation 11 can be less than T0, T4, and T6 in Equation 10, or can be omitted. That is, the terminal can measure signal strengths of neighbor nodes within a cell through one instance of a mutual correlation operation using Equation 7. Therefore, T0 in Equation 11 is reduced compared with T0 in Equation 10.

Figure 15:
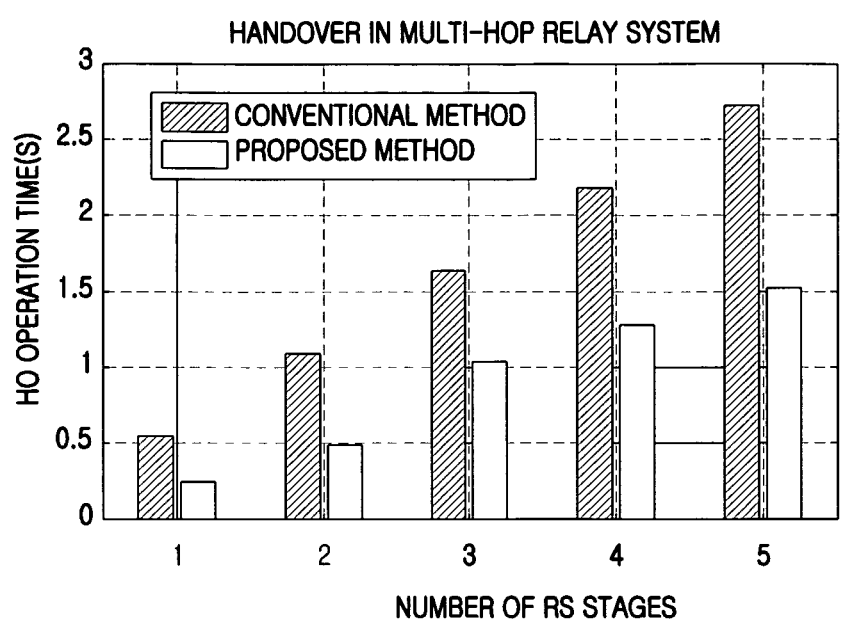
FIG. 15 is a view illustrating a change in a handover performance time according to an exemplary embodiment.

FIG. 15 illustrates a change in a handover performance time according to an exemplary embodiment.

As illustrated in FIG. 15, the terminal performs one instance of inter-cell handover and four instances of intra-cell handover in FIG. 12.

At this point, in the case of performing the handover of FIG. 6 using a hierarchical preamble, handover performance time is reduced compared with the case of performing the handover of FIG. 2.

As described above, a preamble is formed to include a cell ID assigned to an upper BS and a subcell ID assigned to a lower node at a serving node of a hierarchical cellular system, and an intra-cell handover procedure is simplified, so that the terminal can easily distinguish between an inter-cell handover and an intra-cell handover, and an overhead during a handover can be reduced because the intra-cell handover procedure is simplified.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A handover method of a wireless communication system using a hierarchical cellular scheme, the method comprising:
   determining whether to start scanning for a handover using a signal quality of a serving node;
   when the scanning for the handover starts, measuring signal qualities of one or more neighbor nodes, and measuring signal qualities of one or more neighbor macro cells through a first preamble comprising a first identifier for distinguishing a macro cell; and
   selecting between an intra-cell handover and an inter-cell handover using the signal qualities of the serving node, the one or more neighbor nodes, and the one or more neighbor macro cells,
   wherein the serving node is one of a serving macro cell and a serving small cell,
   wherein the one or more neighbor nodes include one or more small cells associated with the serving macro cell when the serving node is the serving macro cell,
   wherein the one or more neighbor nodes include the serving macro cell associated with the serving small cell and one or more neighbor small cells included in the serving macro cell when the serving node is the serving small cell, wherein the serving small cell and the neighbor small cell are distinguished by a second preamble comprising a second identifier, wherein the first preamble and the second preamble are included in a third preamble.

2. The method of claim 1, further comprising, before measuring the signal quality of the serving node, confirming information on the one or more neighbor nodes and the one or more neighbor macro cells from a neighbor node list received from the serving node.

3. The method of claim 1, wherein the serving small cell comprises at least one of a relay station and a femto cell.

4. The method of claim 1, wherein determining whether to start scanning comprises:
when the serving node is the serving small cell, confirming the signal quality of the serving node through the second preamble comprising the second identifier configured to distinguish one or more small cells having the same first identifier; and
determining whether to start scanning for a handover using the signal quality of the serving node.

5. The method of claim 1, wherein determining whether to start scanning comprises:
when the serving node is the serving macro cell, confirming the signal quality of the serving node through the first preamble; and
determining whether to start scanning for the handover using the signal quality of the serving node.

6. The method of claim 1, wherein determining whether to start scanning comprises:
measuring the signal quality of the serving node; and
comparing the signal quality of the serving node with a reference value for determining whether to start the scanning for the handover.

7. The method of claim 1, wherein selecting between an intra-cell handover and an inter-cell handover comprises:
comparing the signal quality of the serving macro cell with a reference value for an intra-cell handover; and
when the signal quality of the serving macro cell is greater than the reference value, selecting the intra-cell handover.

8. The method of claim 1, wherein selecting between an intra-cell handover and an inter-cell handover comprises:
comparing the signal quality of the serving macro cell with the signal qualities of the one or more neighbor macro cells; and
when the signal quality of the serving macro cell is greater than the signal qualities of the one or more neighbor macro cells, selecting the intra-cell handover.

9. The method of claim 1, further comprising:
when the intra-cell handover is selected, confirming signal qualities of one or more small cells having a first identifier of the serving macro cell;
selecting a target small cell on which a handover is to be performed using the signal qualities of the one or more small cells; and
performing the handover to the target small cell.

10. The method of claim 9, wherein performing the handover comprises:
performing a ranging procedure with the target small cell; and
performing a capability negotiation procedure with the target small cell to access the target small cell.

11. The method of claim 1, further comprising:
when the inter-cell handover is selected, selecting a neighbor macro cell having best signal quality from the one or more neighbor macro cells as a target macro cell on which a handover is to be performed;
measuring signal qualities of one or more small cells having a first identifier of the target macro cell through the second preamble comprising the second identifier for distinguishing the one or more small cells having the same first identifier;
selecting a target node on which a handover is to be performed using signal qualities of the one or more small cells and the target macro cell; and
performing the handover to the target node.

12. The method of claim 11, wherein performing the handover comprises:
performing a ranging procedure with the target node;
performing a capability negotiation procedure with the target node; and
performing an authorization procedure and a registration procedure with the target node to access the target node.

13. The method of claim 1, wherein the first preamble and the second preamble are assigned to different symbols in the single preamble.

14. The method of claim 1, wherein the first preamble and the second preamble are assigned to the same symbol in the single preamble.

15. The method of claim 14, wherein the second identifier included in the second preamble is located in the same symbol as that of the first preamble comprising the first identifier using one of a subcarrier set phase change scheme, a subcarrier shift scheme, and an imaginary part adding scheme.

16. A terminal configured to perform a handover in a wireless communication system using a hierarchical cellular scheme, the terminal configured to:
determine whether to start scanning for a handover using a signal quality of a serving node;
when the scanning for the handover starts, measure signal qualities one or more neighbor nodes, and measure signal qualities of one or more neighbor macro cells through a first preamble comprising a first identifier for distinguishing a macro cell; and
select between an intra-cell handover and an inter-cell handover using the signal qualities of the serving node, the one or more neighbor nodes, and the one or more neighbor macro cells,
wherein the serving node is one of a serving macro cell and a serving small cell,
wherein the one or more neighbor nodes include one or more small cells associated with the serving macro cell when the serving node is the serving macro cell,
wherein the one or more neighbor nodes include the serving macro cell associated with the serving small cell and one or more neighbor small cells included in the serving macro cell when the serving node is the serving small cell,
wherein the serving small cell and the neighbor small cell are distinguished by a second preamble comprising a second identifier,
wherein the first preamble and the second preamble are included in a third preamble.

17. The terminal of claim 16, the terminal further configured to:
before the measurement of the signal quality of the serving node, confirm information on the one or more neighbor nodes and the one or more neighbor macro cells from a neighbor node list received from the serving node.

18. The terminal of claim 16, wherein the serving small cell comprises at least one of a relay station and a femto cell.

19. The terminal of claim 16, the terminal further configured to:
when the serving node is the serving small cell, confirm the signal quality of the serving node through the second preamble comprising the second identifier configured to distinguish one or more small cells having the same first identifier; and
determine whether to start scanning for a handover using the signal quality of the serving node.

20. The terminal of claim 16, the terminal further configured to:
when the serving node is the serving macro cell, confirm the signal quality of the serving node through the first preamble; and
determine whether to start scanning for the handover using the signal quality of the serving node.

21. The terminal of claim 16, the terminal further configured to:
measure the signal quality of the serving node; and
compare the signal quality of the serving node with a reference value for determining whether to start the scanning for the handover.

22. The terminal of claim 16, wherein the first preamble and the second preamble are assigned to different symbols in the single preamble.

23. The terminal of claim 16, wherein the first preamble and the second preamble are assigned to the same symbol in the single preamble.

24. The terminal of claim 23, wherein the second identifier included in the second preamble is located in the same symbol as that of the first preamble comprising the first identifier using one of a subcarrier set phase change scheme, a subcarrier shift scheme, and an imaginary part adding scheme.

* * * * *